US012650391B2

(12) United States Patent
Cargol et al.

(10) Patent No.: US 12,650,391 B2
(45) Date of Patent: Jun. 9, 2026

(54) GRAVITY-FED TOMOGRAPHY SYSTEM

(71) Applicant: Spectrohm, Inc., McLean, VA (US)

(72) Inventors: Timothy L. Cargol, McLean, VA (US);
Leo S. Ludwick, Potomac, MD (US);
Conner Dickson, Sterling, VA (US)

(73) Assignee: Spectrohm, Inc., McLean, VA (US)

( * ) Notice: Subject to any disclaimer, the term of this
patent is extended or adjusted under 35
U.S.C. 154(b) by 323 days.

(21) Appl. No.: 18/617,326

(22) Filed: Mar. 26, 2024

(65) Prior Publication Data

US 2024/0328963 A1 Oct. 3, 2024

Related U.S. Application Data

(60) Provisional application No. 63/492,351, filed on Mar.
27, 2023.

(51) Int. Cl.
*G01N 22/00* (2006.01)
(52) U.S. Cl.
CPC .................................... *G01N 22/00* (2013.01)
(58) Field of Classification Search
CPC .............................. G01N 22/00; G01N 23/046
See application file for complete search history.

(56) References Cited

U.S. PATENT DOCUMENTS

| | | | | |
|---|---|---|---|---|
| 10,282,902 B1 * | 5/2019 | Mishra | .................. | G06T 17/20 |
| 2005/0090743 A1 * | 4/2005 | Kawashima | ........... | A61B 8/463 |
| | | | | 600/443 |
| 2007/0187299 A1 * | 8/2007 | Valerio | .................... | B07B 4/02 |
| | | | | 209/571 |

* cited by examiner

*Primary Examiner* — Resha Desai
*Assistant Examiner* — Bongani Jabulani Mashele
(74) *Attorney, Agent, or Firm* — Scale LLP

(57) ABSTRACT

Systems, methods, and computer readable memory are dis-
closed for constructing a three-dimensional tomogram using
a gravity-fed tomography system. A gravity-fed tomography
system may generate a three-dimensional image through a
barrier. The system may include a chute. The chute may be
configured to receive a three-dimensional object having x-,
y- and, z-dimensions. The chute may be configured to be
non-perpendicular to a gravitational vector such that gravity
facilitates movement of the object through the chute. The
system may include one or more sources. The sources may
emit electromagnetic radiation toward the object when the
object is disposed in the chute. The system may include one
or more receivers, which may receive at least a portion of the
electromagnetic radiation emitted by the one or more
sources.

20 Claims, 8 Drawing Sheets

Receiver 318

Source 316

Source 316

Receiver 318

Chute 300

324

320

322

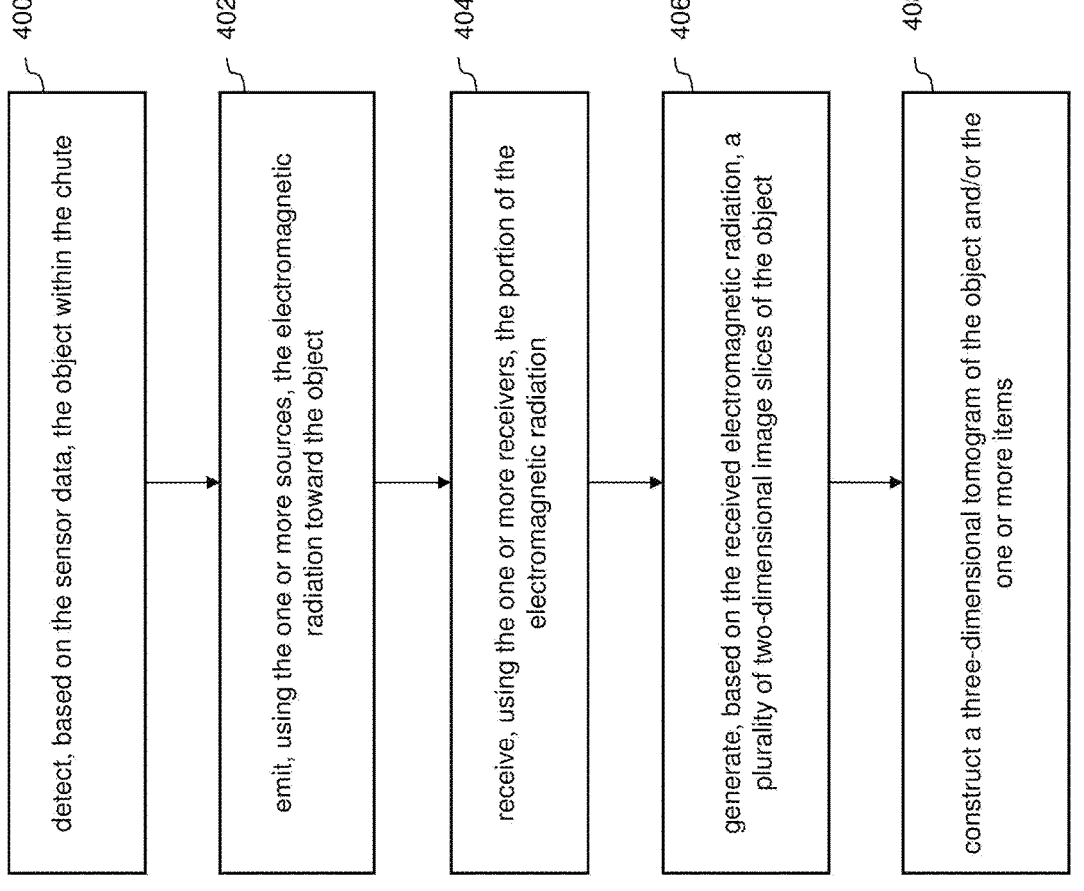

400 — detect, based on the sensor data, the object within the chute

402 — emit, using the one or more sources, the electromagnetic radiation toward the object 404 — receive, using the one or more receivers, the portion of the electromagnetic radiation 406 — generate, based on the received electromagnetic radiation, a plurality of two-dimensional image slices of the object 408 — construct a three-dimensional tomogram of the object and/or the one or more items

*FIG. 4*

GRAVITY-FED TOMOGRAPHY SYSTEM

RELATED APPLICATIONS

This application claims the benefit of U.S. Provisional Application No. 63/492,351 filed Mar. 27, 2023, which is incorporated herein by reference in its entirety.

TECHNICAL FIELD

Various aspects of the present disclosure relate generally to systems and methods for constructing a three-dimensional tomogram using a gravity-fed tomography system.

BACKGROUND

There is a need to generate three-dimensional representations of objects in cases where the objects are obscured from view by a barrier, such as the walls of a container (e.g., package or bag). Visualizing objects through a barrier can be important for security applications, such as ensuring that dangerous objects are not admitted to areas in which they are prohibited. The capability is also important for verification and quality assurance applications, such as verifying that the contents of a package to be shipped were properly selected and packed. Present systems for generating three-dimensional representations of objects through a barrier rely on internally synchronized mechanical systems to feed objects at a defined pace—e.g. a conveyor belt paced to a rotating beam. These internal mechanical or pacing requirements prevent existing systems' use in cases where external automation systems or irregular or asynchronous flow presents objects where visualization would otherwise be beneficial.

This can be advantageous for a variety of applications, such as product manufacture, performing quality control protocol, and many other areas where visualizing objects through barriers and generating three-dimensional representations of objects is useful to perform analysis, visualizations, manipulations, and simulations on a three-dimensional model without having to risk altering the actual object.

The present disclosure is directed to overcoming one or more of these above-referenced challenges.

SUMMARY

The following description presents a simplified summary intended to provide a basic understanding of some aspects described herein. This summary is not an extensive overview of the claimed subject matter. It is intended to neither identify key or critical elements of the claimed subject matter nor delineate the scope thereof.

According to certain aspects of the disclosure, systems, methods, and computer readable memory are disclosed for constructing a three-dimensional tomogram using a gravity-fed tomography system.

A gravity-fed system may generate a tomogram image through a barrier. The system may include a chute. The chute may be configured to receive a three-dimensional object having x-, y- and, z-dimensions. The chute may be configured to be non-perpendicular to a gravitational vector such that gravity facilitates movement of the object through the chute.

The system may include one or more sources. The sources may emit electromagnetic radiation toward the object when the object is disposed in the chute. The system may include one or more receivers, which may receive at least a portion of the electromagnetic radiation emitted by the one or more sources.

The system may include one or more sensors. The one or more sensors may obtain sensor data configured to indicate a position and/or a velocity of the object as the object is pulled, at least in part, by gravity through the chute.

The system may detect, based on the sensor data, the object within the chute. The system may emit, using the one or more sources, the electromagnetic radiation toward the object while the object is disposed in the chute. Using the one or more receivers, the portion of the electromagnetic radiation may be received. The received electromagnetic radiation may comprise information relating to one or more items within the object. For example, the information may indicate features of the one or more items within the object.

The system may generate, based on the received electromagnetic radiation, a plurality of two-dimensional image slices of the object as the object is pulled, at least in part, by gravity through the chute. The image slices may include information related to the information relating to the one or more items within the object.

The system may construct a three-dimensional tomogram of the object and/or the one or more items by arranging the plurality of the image slices in a series. A distance in the z-dimension between a first image slice and a second image slice of the plurality of image slices may be determined based, at least in part, on the sensor data that indicates the position and/or the velocity of the object as the object is pulled, at least in part, by gravity through the chute.

Further variations encompassed within the systems and methods are described in the detailed description below.

BRIEF DESCRIPTION OF THE DRAWINGS

The accompanying drawings, which are incorporated in and constitute a part of this specification, illustrate various exemplary aspects and together with the description serve to explain the principles of the disclosed technology.

FIG. 4 shows an exemplary process for generating a three-dimensional image using gravity-fed tomography.

DETAILED DESCRIPTION

In general, the present disclosure is directed to methods and systems for producing a three dimensional tomographic image of any object having x-, y-, and z-dimensions from beams of electromagnetic radiation operating within an x-y plane, while the object moves at an arbitrary speed along a z-axis, fed at least in part, by gravity.

Figure 1B:
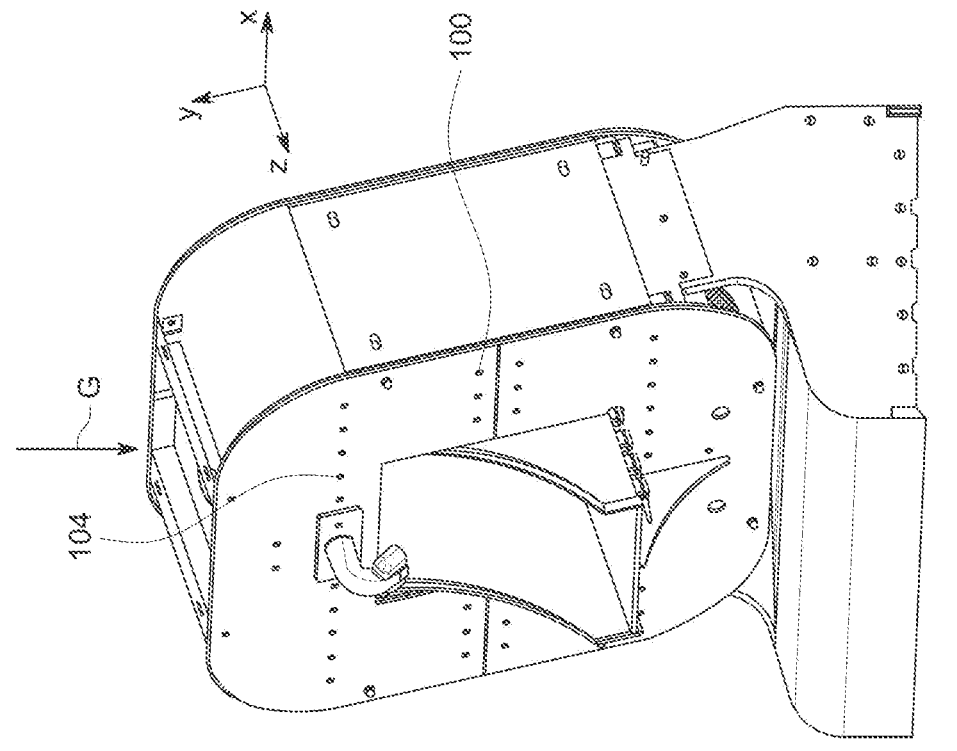
FIGS. 1A and 1B show an exemplary gravity-fed tomography system.
Figure 1A:
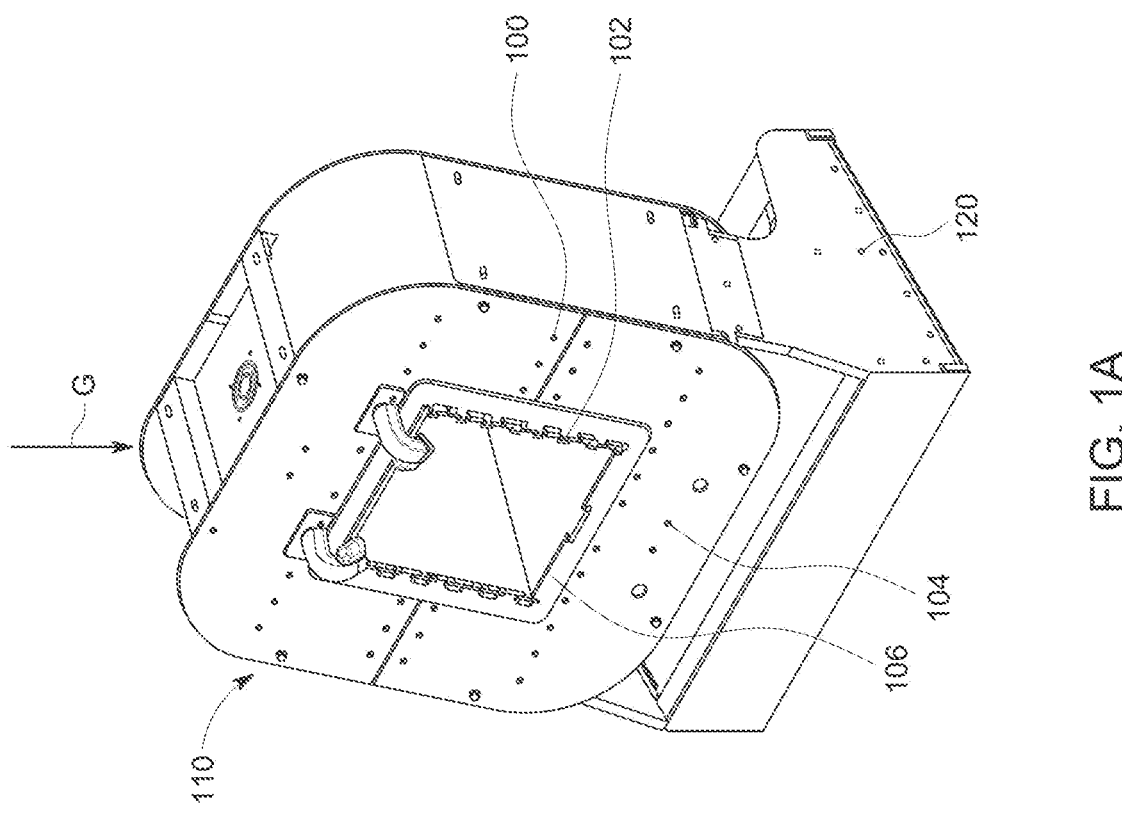

FIGS. 1A and 1B show exemplary diagrams of the gravity-fed tomography system. The system may use radio frequency electromagnetic energy sources. In some embodiments, energy sources in any portion of the electromagnetic spectrum may be used. As shown, the system may include one or more of a horizontal (x-axis) emitting source 100, a horizontal waveguide 102, a vertical (y-axis) emitting source 104, and a vertical waveguide 106. In some embodiments, additional sources may be provided. For example, multiple sources may be positioned at different points along the z-axis of the chute to capture supplemental x-y plane image data relating to the object along the same direction, and the data from the multiple sources may be combined to produce higher-accuracy images. Additional sources may also be oriented at a plurality of angles to capture image data from different angles from the x-y plane. This image data may also be combined to produce higher-accuracy images. Examples of these and other components are described in greater detail below with respect to FIGS. 2A, 2B, 3, and 4.

Figure 2B:
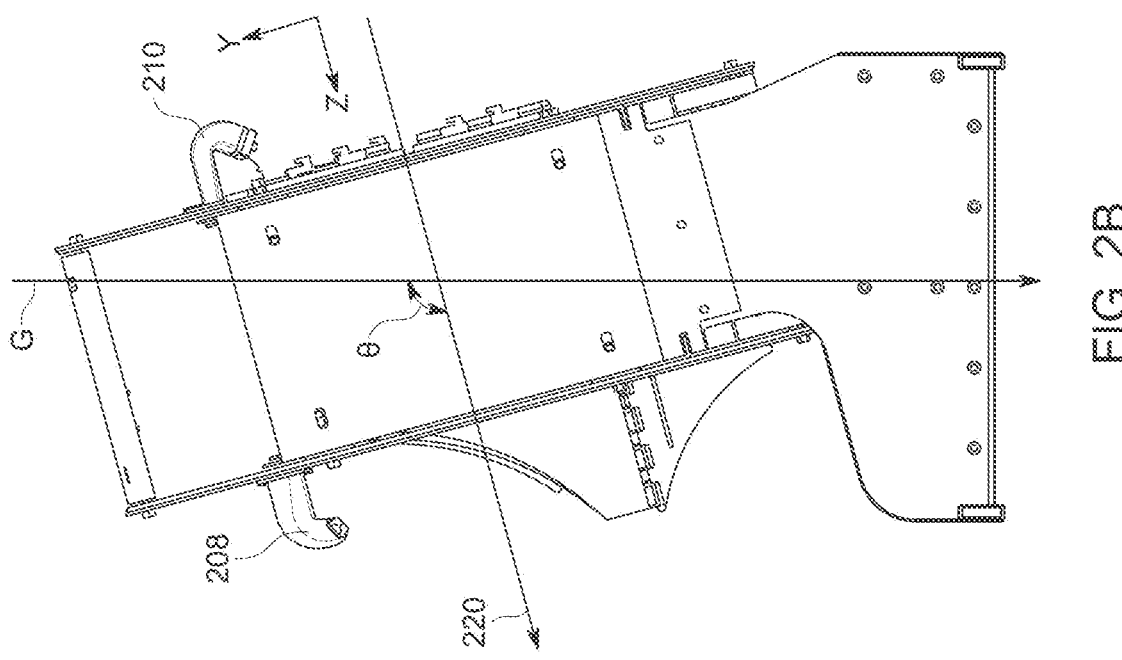
FIGS. 2A and 2B show additional views of gravity-fed tomography systems.
Figure 2A:
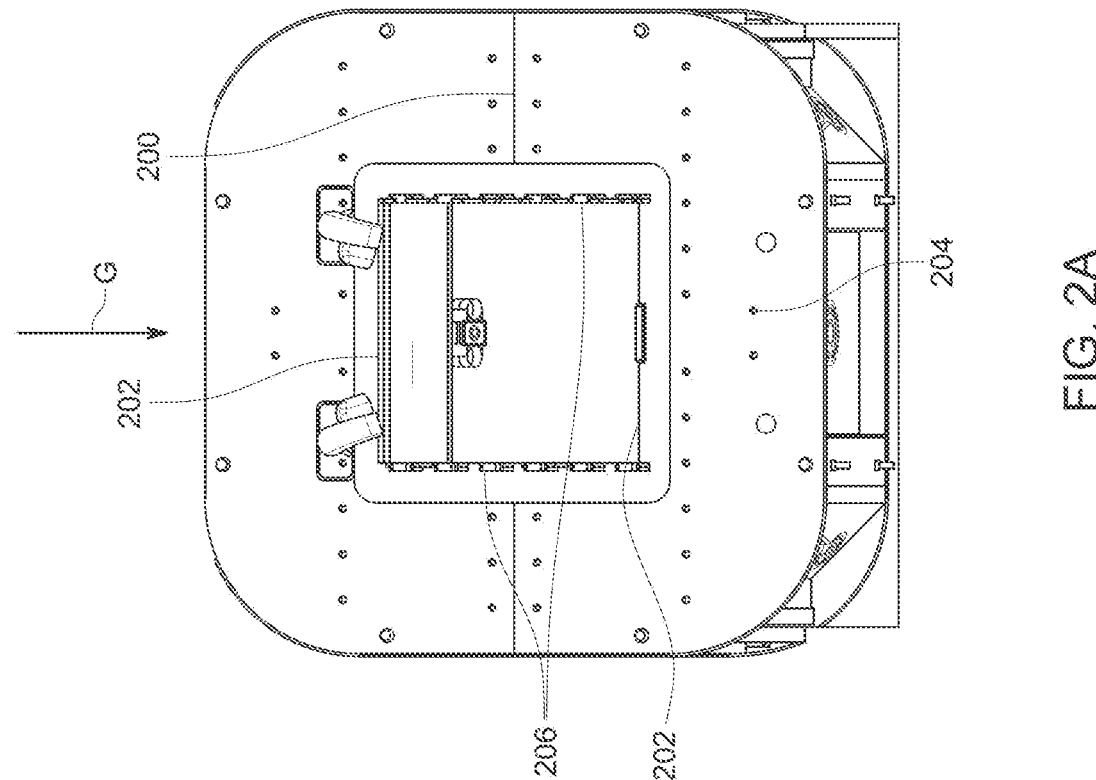

FIGS. 2A and 2B show additional views of a gravity-fed system for generating a tomogram. As shown in FIG. 2A, the system may include a horizontal emitting source 200, horizontal waveguides 202, a vertical emitting source 204, and vertical waveguides 206.

As shown in FIG. 2B, the system may include one or more rear sensors 208 and one or more front sensors 210. Sensors 210 may be configured to capture data relating to the position, velocity, and dimensions of one or more surfaces facing an entry side of the system. Sensors 208 may be configured to capture data relating to the position, velocity, and dimensions of one or more surfaces facing an exit side of the system. The sensors may be part of the sensor module described with respect to FIG. 5, which may be a component of a larger machine vision system. In some embodiments, one or more of the sensors may be optical cameras. In some embodiments, the optical cameras may be configured to capture images with resolution of at least 0.5 megapixels. In some embodiments, one or more of the sensors may be lasers. In some embodiments, the system may be configured to determine position, velocity, and dimensional parameters relating to an object based on a round-trip time of light emitted by the lasers. As described with respect to FIG. 5, the sensors may be continuously running and sending sensor data to an object detection module described with respect to FIG. 6. As described with respect to FIG. 4, the sensor data collected by the sensors may be used to determine the position and/or velocity of the object as it moves along the chute. In some embodiments, at least two front sensors 210 and at least one rear sensor 208 may be included in the system. Other numbers of sensors may be used. In some embodiments, front sensors 210 may be used to collect sensor data related to length and width of the object while the rear sensor 208 may be used to collect sensor data related to the height and position of the object.

The system may include a frame 110 and a foot 120. The frame 110 may surround the chute through which objects are received. The foot 120 may be configured to abut the ground or a floor and support the frame 110. In other embodiments, the foot 120 may be omitted. For example, the frame 110 may be installed in or supported by a structure other than the foot 120. This may be particularly advantageous in cases where the frame is arranged such that the chute is oriented substantially parallel to a gravitation vector, such that objects may be dropped through the chute (as opposed to sliding through while contacting a surface of the chute).

Figure 3:
FIG. 3 shows an exemplary internal structure for a gravity-fed tomography system.

The chute, which may be described in FIGS. 1-3, may be configured to receive a three-dimensional object. The chute may include any passage through which an object travels. A central axis 220 (see FIG. 2B) of the chute may be non-perpendicular to a gravitational vector such that gravity facilitates movement of the object through the chute. In some embodiments, central axis 220 may be oriented along or parallel to the z-axis of the system. Gravity may determine or influence the z-axis motion of the object as it passes through the chute. Optionally, forces other than gravity and independent of the imaging modality may also be used to facilitate the movement of the object through the chute. For example, a user may push an object through the chute by hand, or another, external, mechanism may be used to advance the object. In optional embodiments in which the chute is arranged to be perpendicular to the gravitation vector, external forces may be the primary or sole forces used to advance the object through the chute. In some embodiments, the chute may be oriented parallel to or substantially parallel to a gravitational vector (e.g., within 10 degrees of parallel to a gravitational vector). In such cases, objects may free-fall through the chute. In other embodiments, the chute may be oriented such that an angle between the central axis 220 of the chute and the gravitational vector G is between 85-60 degrees, between 80-70 degrees, between 85-45 degrees, between 85-10 degrees, or between 85-0 degrees. The chute may be made of material with a friction coefficient suitable to control the speed at which a received object travels. In some embodiments, the friction coefficient may be between 0.05 and 0.35, 0.1 and 0.30, or 0.15 and 0.25.

In other embodiments, the chute may be oriented such that the central axis 220 of the chute is perpendicular or within 2 degrees, 5 degrees, or 10 degrees of perpendicular to the gravitational vector G. Whether the central axis 220 is perpendicular or non-perpendicular to the gravitational vector G, the system may be considered beltless as external forces move the object through the chute without the use of a conveyor belt entirely, or without the use of a conveyor belt that is integral to the system. As used herein, a conveyor belt that is integral to a tomography system refers to a conveyor belt that is fixedly attached to a frame and carries objects through a scanning portion of the tomography system. For example, a beltless tomography system may be disposed in a use environment, and users may advance objects through the chute by hand. In other cases, a non-integral belt may be positioned next to the tomography system such that objects travel along the non-integral belt, fall off the non-integral belt, and slide through the chute. In still other cases, the tomography system may be disposed in a use environment, and a non-integral belt may be positioned such that a portion of the non-integral belt passes through the chute and can carry objects through the chute.

The system, inclusive of the frame 110 and, when present, the foot 120 may have: a width that is less than 6 feet, less than 5 feet, less than 4 feet, less than 3 feet, or less than 2 feet; a height that is less than 10 feet, less than 8 feet, less than 6 feet, less than 5 feet, less than 4 feet, less than 3 feet, or less than 2 feet; and a depth that is less than 4 feet, less than 3 feet, less than 2 feet, less than 1.5 feet, or less than 1 foot. These dimensions may be combined in any arrangement. The system, inclusive of the frame 110 and, when present, the foot 120 may have a weight less than 1,000 pounds, less than 800 pounds, less than 700 pounds, less than 600 pounds, less than 500 pounds, less than 400 pounds, less than 300 pounds, or less than 200 pounds. The system, as assembled, may be able to fit through a standard door (36"×80"), may be loaded on a standard elevator, and may be configured to be transported on a dolly or hand-pushed cart from one location to another.

FIG. 3 shows a diagram of an exemplary gravity-fed tomography system. The structure may include a chute 300, one or more sources 316 configured to emit electromagnetic radiation toward an object 320 disposed in the chute 300, and one or more receivers 318 configured to receive at least a portion of the electromagnetic radiation emitted by the sources. As shown in FIG. 3, an object 320 may be placed on a surface 324 within the chute 300 and may travel through the chute by sliding along surface 324. Sources 316 and receivers 318 may be arranged to emit electromagnetic radiation toward object 320 and receive at least a portion of the electromagnetic radiation after it has passed through the object 320. By analyzing the received electromagnetic radiation, information regarding the object 320 and items 322 disposed within the object can be obtained. As described above, any number of sources and probes may be positioned to collect image data at any number of angles relative to the chute 300, and sources may also be arranged such that multiple sources are aligned along a common angle relative to the chute 300 to capture redundant or supplemental data, which may then be analyzed to improve the quality of the captured image data.

The chute 300 may be a passage through which an object 320 may travel from one side of the system to the other. The chute 300 may have a surface 324 that define the passage, one or more of which may be configured to contact objects 320 as the objects 320 travel through the chute 300. Although the chute 300 is shown in a rectangular configuration in FIGS. 1-3, the chute 300 may have other shapes, such as circular or ovular, triangular, pentagonal, hexagonal, octagonal, or others. An object 320 to be scanned may be placed in the chute 300. The object 320 may be pulled along the z-axis through the chute 300 based at least partially on gravity or other external forces independent of the system.

As described with respect to FIG. 4, the receivers 318 may measure deflections, field strength, perturbations, impedance, and/or other metrics in the electric fields associated with the electromagnetic radiation as it propagates through the different materials of the object. One or more sources 316 may be disposed along an x-axis (or other axis) and one or more sources may be disposed along a y-axis (or other axis). In some embodiments, multiple beams may be simultaneously emitted and propagate horizontally and vertically through the object, which may result in multiple samples of the object. In such a case, the beams may be harmonized and the data collected from the beams may be aggregated.

In some embodiments, the imaging system may incorporate any of the elements, functional characteristics, and modes of operation described in U.S. patent application Ser. No. 16/718,102, U.S. patent application Ser. No. 16/378, 425, issued as U.S. Pat. No. 10,542,906, and/or U.S. patent application Ser. No. 16/718,106, each of which is incorporated by reference herein in its entirety.

FIG. 4 shows an exemplary method for generating a three-dimensional image using gravity-fed tomography. The steps described herein may be performed in any combination or order.

At step 400, the object may be detected in the chute. The object may be detected by sensors in the sensor module described with respect to FIG. 5. The sensor module may be a component a machine vision system and may include one or more optical cameras and/or lasers coupled to the system as described with respect to FIGS. 1-2. The sensors may use an object detection module described with respect to FIG. 6 to detect the presence of the object in the chute.

The object detection module may be continuously running. For example, the object detection module may continuously or on regular intervals check for detection of an object based on the sensor data feed. In some embodiments, the object detection module may check for a detection at every camera frame. As described with respect to FIG. 6, a custom trained algorithm may be used by the object detection module to check for detection. The one or more sensors may obtain sensor data indicating a position and/or a velocity of the object as the object is pulled through the chute. The position and/or velocity may be relative to the z-axis at a given time slot through which the object moves. The position and/or velocity may be updated at each subsequent time slot where the object detection module detects an object. The position may be the end-to-end position of the object in the free space of the chute and may be computed as x, y and z coordinates. In some embodiments, the x and y coordinates may be constant while the z coordinate changes. After the object leaves the chute, the data related to the position may be used to determine the overall dimensions of the object. The position and/or velocity may be used to synchronize the recorded data related to the x dimension in the captured x-y slice with the recorded data related to the y dimension in the captured x-y slice.

At step 402, the electromagnetic radiation may be emitted using one or more sources toward the object. The sources may be emitters and/or transmitters configured to emit electromagnetic radiation toward the object. The emitters may be static relative to the chute, which may allow the speed of the object as it passes through the chute to be dynamic and asynchronous to emitter operation. In some embodiments, a user may use his or her hand to push the object through the chute, thereby controlling the speed at which the object moves through the chute. The sources may emit the electromagnetic radiation when the object is disposed in the chute. The waves associated with the radiation may be sent via a waveguide to respective receivers. The electromagnetic radiation may include X-ray, ultraviolet, infrared, radiofrequency, and/or the like. The radiation may be associated with an energy level, such as low power, as to not pose a health risk for humans. For example, low-powered RF may be used as the emitted electromagnetic radiation. The electromagnetic radiation may include a frequency between 1 MHz and 100,000 GHz. The radiation may include planar waves that travel along waveguides from the sources to the receivers. Based on the frequency being high and the synchronization between the x and y dimensions using the sensor data described with respect to FIG. 5, the object may be able to move through the chute without needing to stop in order to take the measurements needed to construct the image.

The one or more sources may include a first source and a second source. The first source may be configured to emit radiation toward the object along a first direction and the second source may be configured to emit radiation toward the object along a second direction. The first direction and the second direction may be within 5 degrees of perpendicular to one another. In some embodiments, the one or more sources may include a third source configured to emit radiation toward the object along a third direction. The first direction, the second direction, and the third direction may each be angled relative to one-another by at least 10 degrees.

At step 404, one or more receivers may receive a portion of the electromagnetic radiation emitted by the one or more sources. The received radiation may comprise information relating to one or more items within the object. In some embodiments, the radiation received from the first source may indicate items related to the x-dimension of the object in the chute. In some embodiments, the radiation received from the second source may indicate items related to the y-dimension of the object in the chute. The receivers may be capable of transforming the planar waves associated with the emitted radiation into a wave suitable for processing.

At step 406, one or more two-dimensional image slices may be generated based on the electromagnetic radiation received. The process for generating image slices may include the features described in any of U.S. patent application Ser. No. 16/718,102, U.S. patent application Ser. No. 16/378,425, issued as U.S. Pat. No. 10,542,906, and/or U.S. patent application Ser. No. 16/718,106, each of which is incorporated by reference herein in its entirety. The image slices may be generated as the object is pulled, at least in part, by gravity through the chute. The image slices may include information related to the one or more items within the object in the x- and y-dimensions.

The images may be generated, at least partially, by analyzing perturbations, attenuations and/or deflections in the waves associated with the emitted radiation, which may be caused by the one or more features within the object. Two-dimensional images in the x-y plane may be computed by a Radon transform, X-Ray transform, or other inverse algorithm applied to the sensors' data.

The perturbations, attenuations, and/or deflections may be related to electrical and/or mechanical properties of the objects' features interacting with the wave. Field probes may be placed along the waveguide to measure the perturbations and/or deflections as the wave propagates through the waveguide. Field probes may measure deflections, field strength, perturbations, impedance, and/or other metrics in the electric fields associated with the waves as the waves propagate through the different materials of the object within the respective waveguides. The measurements from the field probes, for example a measurement associated with pulse height, may be used to determine the different materials of the object at different times as the object moves along the z-axis. Upon the object detection module detecting an object, the sources may begin emitting waves that propagate through the object. Measurements described herein may be collected as the waves propagate through the object. The measurements may be processed by the receiver and used to capture images slices of the object. The slices may be captured at a frequency of at least 100 Hz. The image slices and/or the measurements may be recorded on memory associated with the receiver.

Upon the object detection module detecting an object, the position and/or speed of the object at given time slots as it travels along the z-axis of the chute may start to be computed. The position and/or speed may be computed continuously until object leaves the chute. Described herein, when the object leaves the chute, the data associated with the position and/or speed may be combined with the image slices to construct a three-dimensional model of the object.

Figure 5:
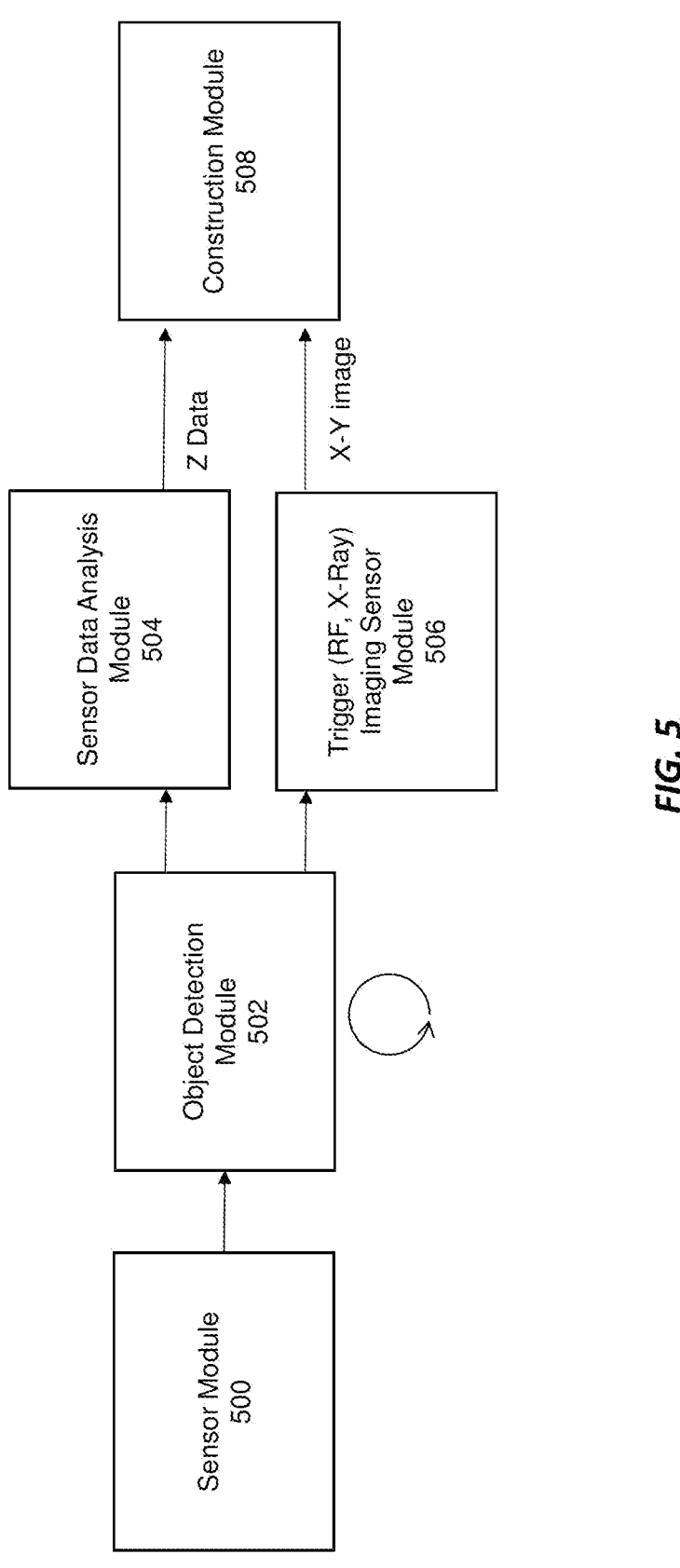
FIG. 5 shows an exemplary system for constructing a three-dimensional tomogram using a gravity-fed tomography system.

The receivers may begin capturing the image based on an output of the detection module described with respect to FIG. 5 indicating that an object is in the chute. In some embodiments, image slice capture may occur at a frequency between 5 Hz to 1 kHz, 5 Hz to 200 Hz, or 50 Hz to 150 Hz.

The first source and the source may be positioned within the chute. In order to generate the image slices, the data associated with the first source, which may be indicative of items in the x-dimension, may be aligned with data associated with the second source, which may be indicative of features in the y-dimension. Doing so may verify that the data from both sources indicates the same portion of the object. Aligning such data may be based on the sensor data described herein.

At step 408, a three-dimensional tomogram of the object and/or the one or more items may be constructed. The tomogram may be constructed by arranging the generated image slices in a series. A position in the z-direction of a given slice in the series and/or a distance between any two slices in the series may be determined based on the sensor data which may indicate the position and/or velocity of the object as the respective slice or slices were captured. As each image slice is captured by the receivers, respective position measurement and velocity measurement may be obtained based on the sensor data at the time the slice was captured. The respective position and velocity of the object as slice is captured may be used to arrange and/or position the slices in the series when constructing the tomogram. Thus, an accurate three-dimensional representation of an object or one or more items within an object may be generated.

In some embodiments, the data processing, slice generation, and tomogram generation steps may be performed on-site using a processor that is integrated with or near a scanner device. In other embodiments, the system may include remote processors that receive and process data from the scanner hardware and perform any or all of the data processing, slice generation, and tomogram generation steps. For example, the data received by the receivers at step 404 may be transmitted in a raw or partially processed form to a remote processor, and the remote processor may perform one, some, or all of steps 404, 406, and 408. In some embodiments, the remote processor may then transmit the generated image slices and/or tomogram(s) to the on-site scanner device or a terminal near the on-site scanner device, and one or more of the generated image slices and/or tomogram(s) may be displayed on a display. The remote processor(s) and terminal(s) may be considered to be part of the tomography system.

FIG. 5 shows an shows an exemplary system for constructing a three-dimensional tomogram using a gravity-fed tomography system. The system may include a sensor module 500, an object detection module 502, a sensor data analysis module 504, a trigger imaging sensor module 506, and a construction module 508.

The sensor module 500 may include one or more sensors described with respect to FIGS. 2B and 4. The sensors may continuously send a feed of images to an object detection module 502. Each time an object is detected by the object detection module 502, the trigger image sensor module 506 may be triggered and the sensors may collect sensor data to be used to compute the position and/or velocity (e.g., which may be referred to as z data) of the object as it is pulled through the chute, as described with respect to FIG. 4. The computation of the position and/or speed may occur on the backend at the sensor data analysis module 504. Additionally, each time an object is detected (e.g., the detection module 502 checks for an object at every interval of the sensor, for example, at every camera frame), an image slice may be captured using the techniques described with respect to FIG. 4. Capturing the image slices and computing the z-axis data may be asynchronous and independent of one another. By combining the z-axis data and the x-y slices, as described with respect to FIG. 4, a three-dimensional tomogram of the object may be constructed by the construction module 508.

Figure 6:
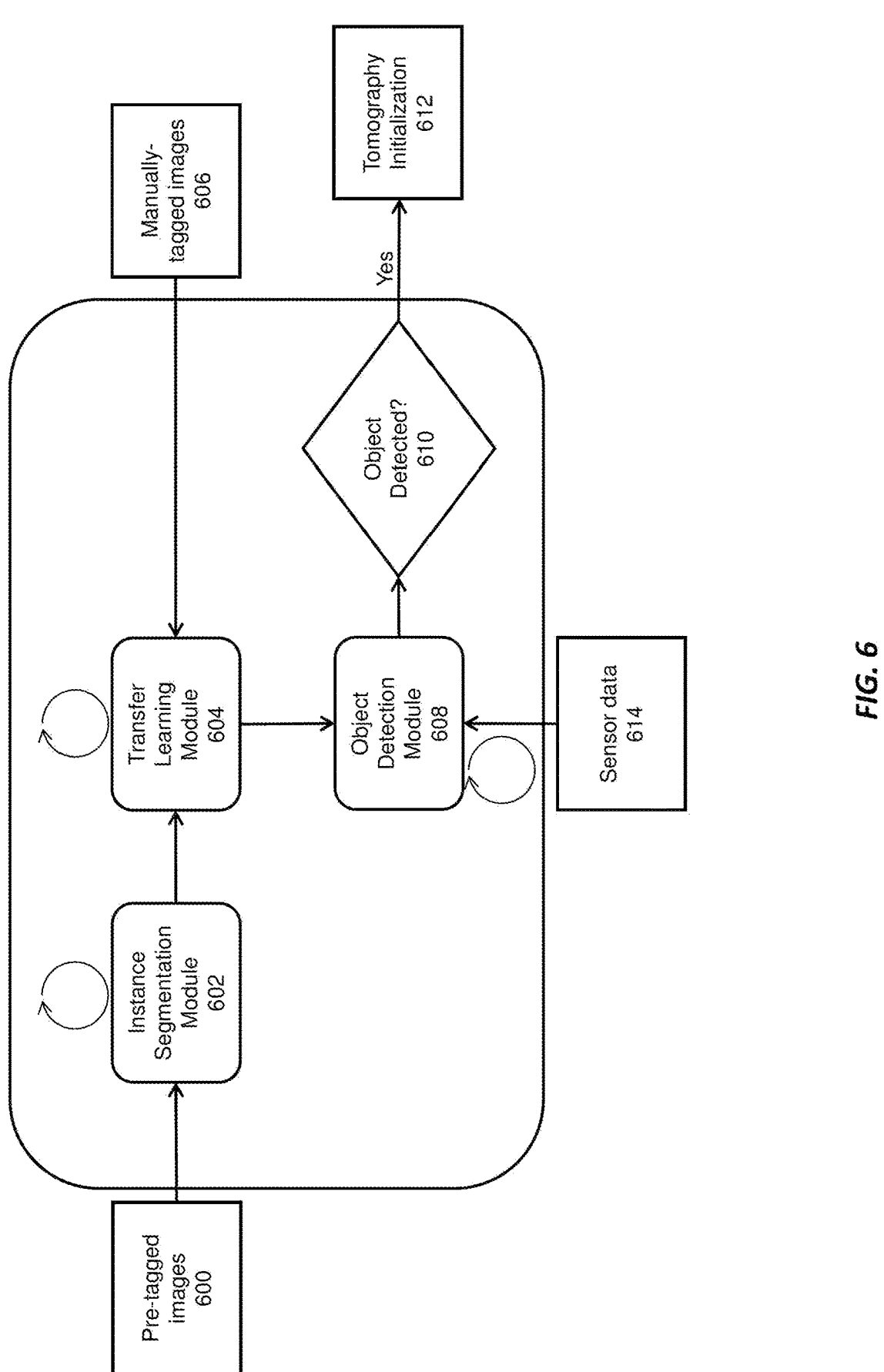
FIG. 6 shows an exemplary system for detecting whether an object is within a chute of a tomography system.

FIG. 6 shows an exemplary system for detecting whether an object is within the chute based on one or more sensors. The system may include and/or be associated with one or more of the following components and information: pre-tagged images 600, instance segmentation module 602, transfer learning module 604, manually-tagged images 606, trained object detection module 608, sensor data 614, object detection 610, and tomography initialization 612. One or more aspects of the system may be linked to the object detection module described with respect to FIG. 5. One of more aspects of the system may run on multiple GPUs running in parallel.

The system may include a machine learning pipeline that trains the system to be able to detect an object based on the sensor data 614 described with respect to FIG. 4. The system may implement other methods to detect the object and such methods may incorporate data other than the sensor data 614 described herein.

As part of the training, the instance segmentation module 602 may include a machine learning model which may be fed pre-tagged images 600 from an object detection, segmentation, and/or captioning dataset. In some embodiments, at least ten or at least one-hundred pre-tagged images 600 may be fed to the model. By using a computer vision and/or pattern recognition framework on the pre-tagged images 600, the model may be initially trained to detect an object in an input image.

After the model is trained by the instance segmentation module 602, it may be "re-trained" by a transfer learning module 604. The transfer learning module 604 may be fed manually-tagged images 606 to the model. The manually-tagged images may depict boxes such as carboard boxes. In some embodiments, the manually-tagged images used to "re-train" the model may include other shapes or training images. In some embodiments, at least 300 manually-tagged images may be used to "re-train" the model. The "re-trained" model may be able to detect and segment pre-determined images such as boxed in real-time.

The model may be deployed on the object detection module described in FIG. 5. Sensor data that the detection module receives as input may be fed to the model. The output may be whether an object, for example, a box, has been detected. The model may run on a loop, continuously checking whether an object is detected. If an object is detected, tomography initialization may begin, which may be described under steps 406 and 408 in FIG. 4. The object detection module may operate at a frequency of at least 10 Hz. In other words, the detection module may output whether there is or is not an object in the chute at least ten times per second. In some embodiments, the object detection module may operate at 100 Hz.

Figure 7:
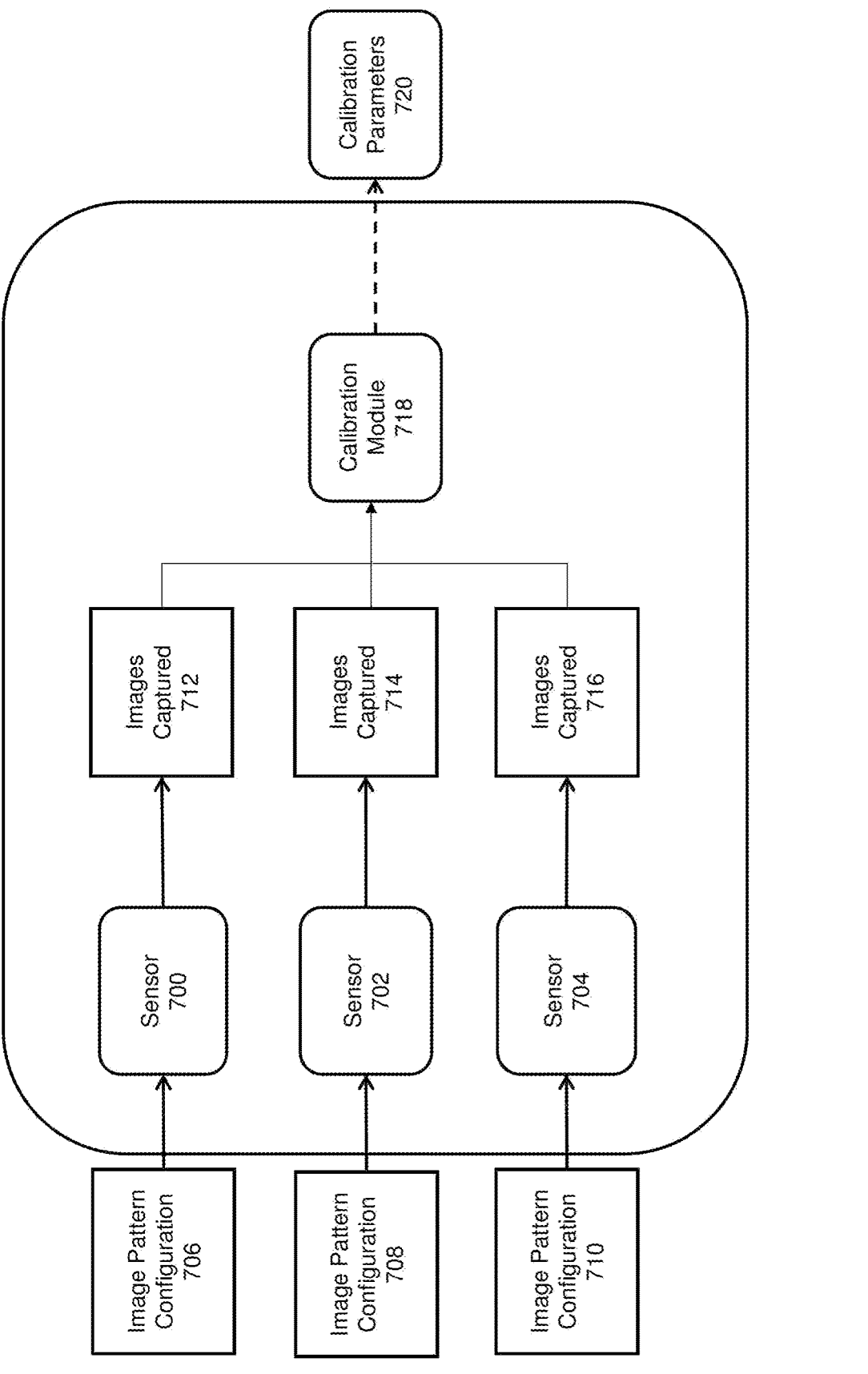
FIG. 7 shows an exemplary calibration system for calibrating the sensors to calculate the distance between image slices.

FIG. 7 shows an exemplary calibration system for calibrating the sensors to calculate the distance between image slices. The calibration system may include and/or be associated with one or more of the following components and information: image pattern configurations (e.g., image pattern configuration 706, image pattern configuration 708, and image pattern configuration 710), sensors (e.g., sensor 700, sensor 702, and sensor 704), captured image set (e.g., image set 712, image set 714, images set 716), calibration module 718, and calibration parameters 720. The calibration system may be linked to the sensor module described with respect to FIG. 5. The calibration system may run the calibration operation prior the chute receiving an object.

The calibration system may allow the tomography system to convert the sensor data into data more suitable for real-world analysis. For example, the sensor data may be in the form of pixel coordinates. The calibration system may calibrate the sensors of the tomography system to enable them to convert the pixel coordinates into world coordinates, for example, millimeters.

Respective image pattern configurations (e.g., image pattern configuration 706, image pattern configuration 708, and image pattern configuration 710) may be configured to each sensor. The image pattern configurations may be identical or may be unique. The pattern may dictate how the sensor data changes from image to image as images are fed to it as input. Using the pattern, each sensor may capture a set of images (e.g., image set 712, image set 714, images set 716) that can be used to determine calibration parameters of the sensors. The captured images may be used as input to a calibration module 718, which may run a script to determine calibrations parameters 720. The parameters 720 may be sent to the sensor module described with respect to FIGS. 4 and 5 and may used to convert pixel coordinates of the image slices captured to world coordinates of the object in the chute.

Computer System

Figure 8:
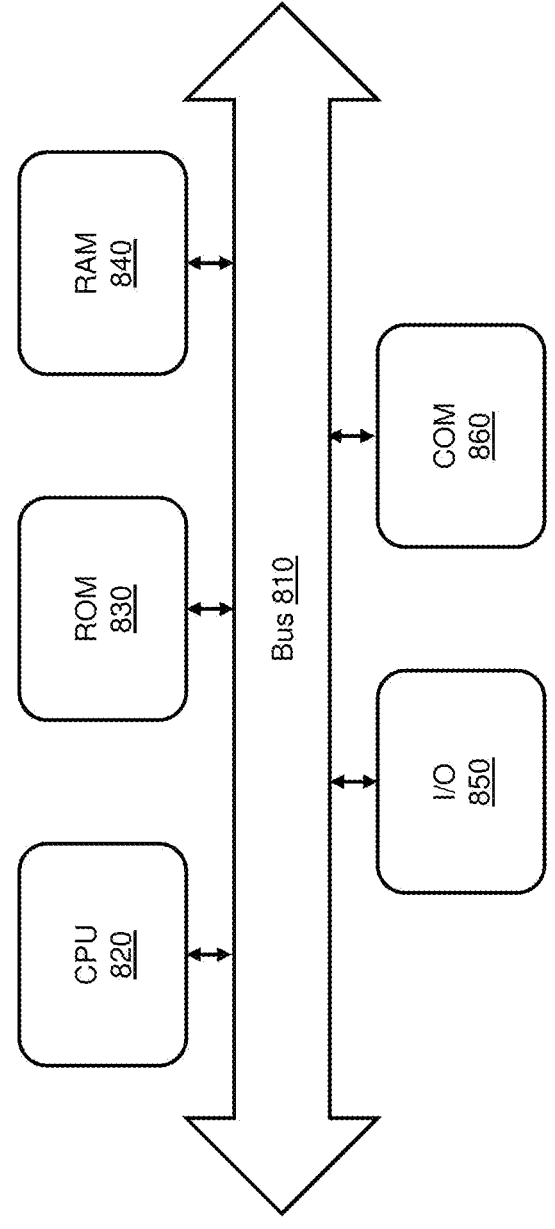
FIG. 8 depicts an example system that may execute techniques presented herein.

FIG. 8 depicts an example system that may execute techniques presented herein. FIG. 8 is a simplified functional block diagram of a computer that may be configured to execute techniques described herein, according to exemplary cases of the present disclosure. Specifically, the computer (or "platform" as it may not be a single physical computer infrastructure) may include a data communication interface 812 for packet data communication. The platform may also include a central processing unit ("CPU") 802, in the form of one or more processors, for executing program instructions. The platform may include an internal communication bus 808, and the platform may also include a program storage and/or a data storage for various data files to be processed and/or communicated by the platform such as ROM 804 and RAM 806, although the system 800 may receive programming and data via network communications. The system 800 also may include input and output ports 810 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of +10% in a stated value.

The term "exemplary" is used in the sense of "example" rather than "ideal." As used herein, the singular forms "a," "an," and "the" include plural reference unless the context dictates otherwise.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A gravity-fed system for generating a tomogram through a barrier, the system comprising:
   a chute, the chute being configured to receive a three-dimensional object having x-, y- and, z-dimensions, wherein the chute is configured to be non-perpendicular to a gravitational vector such that gravity facilitates movement of the object through the chute;
   one or more sources configured to emit electromagnetic radiation toward the object when the object is disposed in the chute;
   one or more receivers configured to receive at least a portion of the electromagnetic radiation emitted by the one or more sources;
   one or more sensors, the one or more sensors being configured to obtain sensor data configured to indicate a position and/or a velocity of the object as the object is pulled, at least in part, by gravity through the chute; and
   one or more processors, wherein the system is configured to:
   detect, based on the sensor data, the object within the chute;
   emit, using the one or more sources, the electromagnetic radiation toward the object while the object is disposed in the chute;
   receive, using the one or more receivers, the portion of the electromagnetic radiation, wherein the received electromagnetic radiation comprises information relating to one or more items within the object;
   generate, based on the received electromagnetic radiation, a plurality of two-dimensional image slices of the object as the object is pulled, at least in part, by gravity through the chute, the image slices comprising the information related to the one or more items within the object in the x- and y-dimensions; and
   construct a three-dimensional tomogram of the object and/or the one or more items by arranging the plurality of the image slices in a series, wherein a distance in the z-dimension between a first image slice and a second image slice of the plurality of image slices is determined based, at least in part, on the sensor data that indicates the position and/or the velocity of the object as the object is pulled, at least in part, by gravity through the chute.

2. The system of claim 1, wherein the plurality of the image slices arranged in the series are parallel to one another, and the position of each slice in the series is based on the determined position and/or speed of the object as the respective slice was captured.

3. The system of claim 1, wherein the radiation comprises plane waves that travel along one or more waveguides, wherein to generate the two-dimensional image slices, the system is configured to analyze perturbations in the plane waves caused by one or more items associated with the object.

4. The system of claim 1, wherein the one or more sources comprises a first source configured to emit radiation toward the object along a first direction and a second source configured to emit radiation toward the object along a second direction.

5. The system of claim 4, wherein the first direction and the second direction are within 5 degrees of perpendicular to one another.

6. The system of claim 4, wherein the first source and the second source are disposed at different positions along the chute, wherein to generate the two-dimensional image slices, the system is configured to align, based on the sensor data, data obtained by the first source with data obtained by the second source such that the aligned data indicates the same portion of the object.

7. The system of claim 4, wherein the one or more sources further comprises a third source configured to emit radiation toward the object along a third direction, wherein the first direction, the second direction, and the third direction are each angled relative to one-another by at least 10 degrees.

8. The system of claim 1, wherein each image slice is associated with a respective position measurement determined based on the sensor data at the time the respective image slice was captured.

9. The system of claim 1, wherein the chute is oriented within 10 degrees of parallel to the gravitational vector.

10. The system of claim 1, wherein the chute comprises a surface having a friction coefficient between 0.05 and 0.30.

11. The system of claim 1, wherein the system has a width, height, and depth, each of which is less than 6 feet, and the system weighs less than 500 pounds.

12. A beltless tomography system for generating a three-dimensional image through a barrier, the system comprising:

a chute, the chute being configured to receive a three-dimensional object having x-, y- and, z-dimensions, wherein the object moves through chute via an external force that is independent of the system and is not applied by an integral conveyor belt;

one or more sources configured to emit electromagnetic radiation toward the object when the object is disposed in the chute;

one or more receivers configured to receive at least a portion of the electromagnetic radiation emitted by the one or more sources;

one or more sensors, the one or more sensors being configured to obtain sensor data configured to indicate a position and/or a velocity of the object as the object is pulled, at least in part, by the external force through the chute; and one or more processors, wherein the system is configured to:

detect, based on the sensor data, the object within the chute;

emit, using the one or more sources, the electromagnetic radiation toward the object while the object is disposed in the chute;

receive, using the one or more receivers, the portion of the electromagnetic radiation, wherein the received electromagnetic radiation comprises information relating to one or more items within the object; and transmit, to one or more processors, data based on the portion of the electromagnetic radiation that is received by the receivers, wherein the one or more processors are configured to:

generate, based on the received electromagnetic radiation, a plurality of two-dimensional image slices of the object as the object is pulled, at least in part, by the external force through the chute, the image slices comprising the information related to the one or more items within the object in the x- and y-dimensions; and construct a three-dimensional tomogram of the object and/or the one or more items by arranging the plurality of the image slices in a series, wherein a distance in the z-dimension between a first image slice and a second image slice of the plurality of image slices is determined based, at least in part, on the sensor data that indicates the position and/or the velocity of the object as the object is pulled, at least in part, by the external force through the chute.

13. The system of claim 12, wherein the plurality of the image slices arranged in the series are parallel to one another, and the position of each slice in the series is based on the determined position and/or speed of the object as the respective slice was captured.

14. The system of claim 12, wherein the radiation comprises plane waves that travel along one or more waveguides, wherein to generate the two-dimensional image slices, the system is configured to analyze perturbations in the plane waves caused by one or more items associated with the object.

15. The system of claim 12, wherein the one or more sources comprises a first source configured to emit radiation toward the object along a first direction and a second source configured to emit radiation toward the object along a second direction.

16. The system of claim 15, wherein the first source and the second source are disposed at different positions along the chute, wherein to generate the two-dimensional image slices, the system is configured to align, based on the sensor data, data obtained by the first source with data obtained by the second source such that the aligned data indicates the same portion of the object.

17. The system of claim 15, wherein the one or more sources further comprises a third source configured to emit radiation toward the object along a third direction, wherein the first direction, the second direction, and the third direction are each angled relative to one-another by at least 10 degrees.

18. The system of claim 12, wherein the chute is oriented within 10 degrees of parallel to the gravitational vector.

19. The system of claim 12, wherein the chute comprises a surface having a friction coefficient between 0.05 and 0.30.

20. The system of claim 12, wherein the system has a width, height, and depth, each of which is less than 6 feet, and the system weighs less than 500 pounds.

* * * * *